March 21, 1961  J. C. JORDAN  2,976,068
BALL JOINT
Filed Sept. 11, 1956

J.C. JORDAN
INVENTOR.
BY E.C. McRae
J.P. Faulkner
J.H. Oster
ATTORNEYS

2,976,068
BALL JOINT

James C. Jordan, Dearborn, Mich., assignor to Ford Motor Company, Dearborn, Mich., a corporation of Delaware Filed Sept. 11, 1956, Ser. No. 609,278

4 Claims. (Cl. 287—90)

This invention relates to ball joints and more particularly to ball joints used in automotive front suspensions.

Ball joints in the past have been complicated by the requirement of an adequate seal to prevent the entrance of dirt and foreign matter into the joint itself. Because these joints were lubricated it was also necessary to seal the joint to prevent the loss of lubricant. If the lubricant was lost or foreign matter permitted to enter the joint acceleraed wear and premature failure of the joint took place. Various and elaborate seals have been and are being used in the art to prevent ball joint failures which include the use of substantial rubber boots, metallic sliding joints, and various combinations of the two. The joints, as a result, have been relatively expensive to manufacture and susceptible to early replacement.

In the instant application the applicant has provided a dry type joint embodying a novel sealing areangement which results in a minimum number of parts and a low cost, compact, dependable unit. In the various embodiments of the invention, a rubber skirt is bonded or otherwise secured to an inner dry bearing material which is commercially available on the market.

One object is to provide an effectively sealed low cost dry ball joint.

A further object is to provide a ball joint embodying a seal which effectively prevents the entrance of dirt or other foreign matter from the joint.

Still another object is to provide a seal for a dry ball joint easy to manufacture and low in cost.

Other objects and advantages of this invention will be made more apparent as this description proceeds particularly when considered in connection with the accompanying drawings in which.

Figure 1:
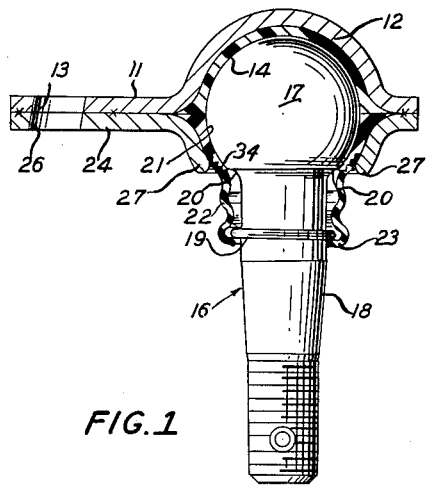
Figure 1 is a cross sectional view of a ball joint provided with the preferred embodiment of the invention.

Referring now to the drawings, reference numeral 11 refers to an upper bracket having an impressed hemispherical embossment 12 near one end of the bracket. A plurality of angled apertures 13 are provided adjacent the periphery of the bracket for attaching the bracket to the appropriate suspension member of the vehicle. The embossment 12 is gradually formed at its outer peripheral edges. Adjacent the inner side of the embossment 12 is a like-shaped upper bearing 14 made from an appropriate bearing material. The bearing may have a lubricant impregnated surface such as found in commercially available tetrofluoro ethylene cloth impregnated with Bakelite, phenolic resin and graphite; and cotton duck, lawn and/or rayon cloth impregnated with phenolic resin and graphite or the like, commercially sold under "ABK–508," "ABK–813" and other designations. Bearings made from "nylon," "Teflon," brass, and others are also available to the trade. The bearing 14 is flush with the underside of the bracket 11 and in full surface contact relationship therewith.

Figure 2:
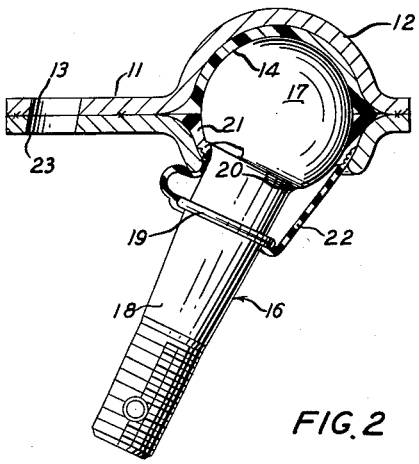
Figure 2 is a cross sectional view of the ball joint shown in Figure 1 in which the stud has been moved within the socket.
Figure 3:
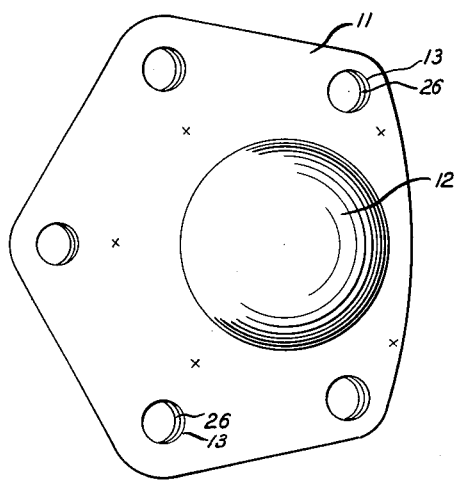
Figure 3 is a plan elevational view of Figure 1.

A stud generally indicated at 16, which has a conical head 17 and a threaded shank 18 is nested within the area defined by the bearing 14 in surface contact relationship. It is to be noted that the bearing 14 and the bracket 11 effectively cover 180° of the conical head 17 of the stud. Below the head 17 and on the threaded shank 18 is an annular ridge 19 integral with the shank 18. The conical head is further provided with an annular recessed shoulder 20 at the point of juncture between the head 17 and the threaded shank 18 for a purpose to be later explained. A lower bearing 21 corresponds to the lower section of the conical head 17 and is made from the same material as the bearing 14 and is placed in edge abutting relationship with the bearing 14 providing an effective bearing area for the head 17. The lower bearing 21 is provided with an annular recessed serrated skirt 34 to which may be bonded a depending rubber boot 22 made from a natural or synthetic elastomer. The lower edge 23 of the boot 22 is squeezed about the shank 18 and below the annular ring 19 to effectively seal the joint. Bonding or securing the rubber boot 22 to the lower bearing skirt 34 may be made by vulcanization where the bearing material permits this type of joinder. Where the bearing material 14 does not permit effective bonding the elastomer may be secured to the skirt, for example, by the provision of a plurality of transverse countersunk apertures (not shown) in the skirt to hold the elastomer to the skirt by a mechanical lock. A lower bracket 24 having angled holes 26 and an inverted apertured embossment with rounded edges 27 underlies the bracket 11 and the lower bearing 21. After aligning the holes 26 of the lower bracket with the holes 13 of the upper bracket, the brackets are secured together as by welding making the joint a completely finished unit. As shown in Figure 2, upon the movement of the stud 16 one side of the boot 22 is stressed whereas the other side remains unstressed. Because of the annular shoulder 20 and the rounded edge 27 the movement does not in any way cause an impingement or cutting of the boot 22 by the leading edge 27 of the lower bracket.

It can be seen, therefore, that in this preferred embodiment the boot 22 is much smaller in size to conventional boots which are generally secured to the outside of the joint. The bearing itself is sealed from the entrance of the foreign matter by the boot which is a continuation of the lower portion of the bearing. Because of the nature of the bearing material, the bearing does not require the use of conventional wet joint lubrication.

Figure 4:
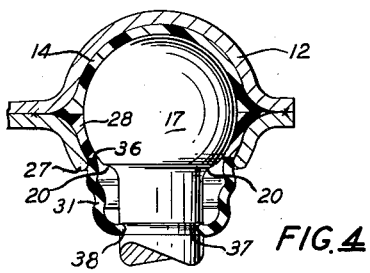
Figure 4 is a modification of the invention.

A modification of the preferred embodiment is shown in Figure 4 wherein the lower bearing 28 has a boot 31 made from a conventional elastomer and bonded or vulcanized to the edge 36 of the lower bearing 28. The bearing in this instance must, of course, be made from a material to which the elastomer may be readily bonded. Bearings made from available phenolic impregnated duck will take this bond. In addition to the change in the securement of the boot to the bearing, the shank 18 of the stud 16 is provided with an annular recessed ring 37 to which the edge 38 reciprocally contacts in edge abutting relationship.

Figure 5:
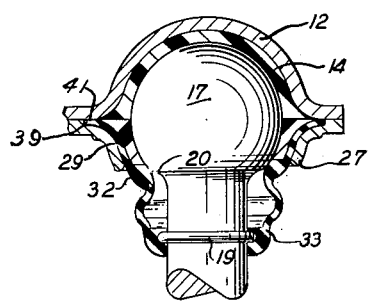
Figure 5 is still another modification.

A further modification is shown in Figure 5 wherein the lower bracket 29 is provided with a depressed inner section 39 comparable to the addition of the lip 41 of the boot 32. Upon the assembling of the joint the lip 41 is squeezed in surface abutting relationship to the bearing 29. The lower skirt 33 is generally U-shaped in section and effectively secures the skirt 32 around the annular ring 19. It can thus be seen that the applicant has provided an effective yet simple seal for a dry type ball joint.

It is to be understood that the invention is not to be limited to the exact construction shown and described, but that various changes and modifications may be made without departing from the spirit and scope of the invention, as defined in the appended claims.

What is claimed is:

1. A ball joint comprising an upper bracket having a hemispherical embossment therein, a hemispherical bearing having non-yieldable characteristics positioned within said embossment in surface abutting relationship, a stud having a substantially spherical shaped head pivotally nested within said upper bearing, a depending threaded shank integral with said head, a lower fragmented bearing having non-yieldable characteristics disposed on the underside of said head and having an annular opening through which the shank extends, said lower fragmented bearing being in edge relationship with said upper bearing, an elastomer sealing boot bonded to said lower bearing and forming a downwardly depending extension, said boot having an annular opening through which said shank protrudes therethrough in surface contacting relationship, a complementary mating bracket underlying said upper bracket and said lower bearing and in surface abutting relationship to said lower bearing, and means for fixedly securing said brackets together.

2. The structure defined by claim 1 which is further characterized in that said lower bearing has a lower recessed serrated edge and said sealing boot is bonded thereto, said shank having a raised annular ring integrally formed below said head whereby said extension edge is disposed beneath said ring in friction contact thereon.

3. A tie rod for an automotive front suspension comprising in combination an upper bracket having a substantially half round impression at one end, a complementary shaped thrust bearing underlying said impression in surface contacting relationship, a stud having a threaded body portion, a raised annular ring on said body portion and an integral substantially round bearing head atop said body portion positioned within said upper bearing whereby not less than 180° of said bearing head will pivot within the upper bearing, a fragmented spherically shaped lower bearing circumferentially surrounding and underlying the bearing head and permitting said stud body to unrestrictedly extend through said lower bearing, a lower bracket having an inverted impression greater in area than said lower bearing said lower bracket being secured to said upper bracket and adapted to underly said bearing in spaced apart relationship, a sealing boot of elastomeric properties having a thickness greater than said space positioned between said lower bracket and said lower bearing in compressed relationship, said boot being contiguous to said bearing and forming a downwardly directed extension to said bearing, and a substantially U-shaped edge provided in the extension straddling said body ring in sealing relationship.

4. A ball joint comprising an upper bracket having a hemispherical embossment therein, a hemispherical bearing having non-yieldable characteristics positioned within said embossment in surface abutting relationship, a stud having a substantially spherical-shaped head pivotally nested within said upper bearing, a depending threaded shank integral with said head, an annular groove in said shank, a lower fragmented bearing having non-yieldable characteristics disposed on the underside of said head in edge abutting relationship with said upper bearing and having an annular opening through which the shank extends, a sealing boot having elastomeric properties bonded to the edge of said annular opening in abutting extending relationship thereto and forming a downwardly depending extension, said boot having an annular opening through which said shank protrudes, the edge of said extension being yieldingly secured within said annular groove in friction relationship thereto, a complementary mating bracket underlying said upper bracket and said lower bearing, and means for fixedly securing said brackets together about said bearings.

References Cited in the file of this patent

UNITED STATES PATENTS

| | | |
|---|---|---|
| 1,959,259 | Zerk | May 15, 1934 |
| 1,980,117 | Turner et al. | Nov. 6, 1934 |
| 2,167,984 | Leighton | Aug. 1, 1939 |
| 2,197,889 | Katcher | Apr. 23, 1940 |
| 2,305,265 | Le Tourneau | Dec. 15, 1942 |
| 2,324,984 | Brown | July 20, 1943 |
| 2,424,431 | Booth | July 22, 1947 |
| 2,752,178 | Hoffman | June 26, 1956 |
| 2,754,141 | Latzen | July 10, 1956 |